United States Patent [19]

Ichida et al.

[11] Patent Number: 5,717,890
[45] Date of Patent: Feb. 10, 1998

[54] METHOD FOR PROCESSING DATA BY UTILIZING HIERARCHICAL CACHE MEMORIES AND PROCESSING SYSTEM WITH THE HIERARCHIACAL CACHE MEMORIES

[75] Inventors: Makoto Ichida, Yokohama; Kazutaka Nogami, Tokyo; Shigeru Tanaka, Fujisawa, all of Japan

[73] Assignee: Kabushiki Kaisha Toshiba, Kanagawa-ken, Japan

[21] Appl. No.: 396,899

[22] Filed: Mar. 1, 1995

Related U.S. Application Data

[63] Continuation of Ser. No. 875,027, Apr. 28, 1992, abandoned.

[30] Foreign Application Priority Data

Apr. 30, 1991 [JP] Japan ................. 3-099237

[51] Int. Cl.⁶ ........................... G06F 12/08
[52] U.S. Cl. ............. 395/449; 395/470; 395/471; 395/463; 395/455; 395/440
[58] Field of Search ..................... 395/449, 470, 395/471, 463, 440, 455

[56] References Cited

U.S. PATENT DOCUMENTS

| | | | |
|---|---|---|---|
| 4,797,814 | 1/1989 | Brenza | 395/449 |
| 4,811,209 | 3/1989 | Rubinstein | 395/471 |
| 4,835,686 | 5/1989 | Furuya et al. | 395/440 |
| 4,939,641 | 7/1990 | Schwartz et al. | 395/473 |
| 5,058,006 | 10/1991 | Durdan et al. | 395/449 |
| 5,241,641 | 8/1993 | Iwasa et al. | 395/449 |
| 5,249,282 | 9/1993 | Segers | 395/449 |
| 5,386,547 | 1/1995 | Jouppi | 395/449 |

OTHER PUBLICATIONS

"Multilevel Cache Hierarchies: Organizations, Protocols, and Performance", Jean–Loup Baer and Wen–Han Wang; Academic Press 1989.

Primary Examiner—Eddie P. Chan
Assistant Examiner—Reginald G. Bragdon
Attorney, Agent, or Firm—Finnegan, Henderson, Farabow, Garrett & Dunner, L.L.P.

[57] ABSTRACT

A method for processing data by utilizing hierarchial cache memories in a system where a lower cache is connected between a processor and a higher cache memory and the higher cache memory is in turn connected to a main memory or connected through a serial arrangement of higher cache memories to the main memory. When a cache miss occurs in the lower cache and the lower cache is full of "dirty data", the data is not written to the main memory but instead to the higher cache. Dirty data is written into the main memory when at least all of the cache memories are filled with dirty data and a cache miss occurs.

16 Claims, 9 Drawing Sheets

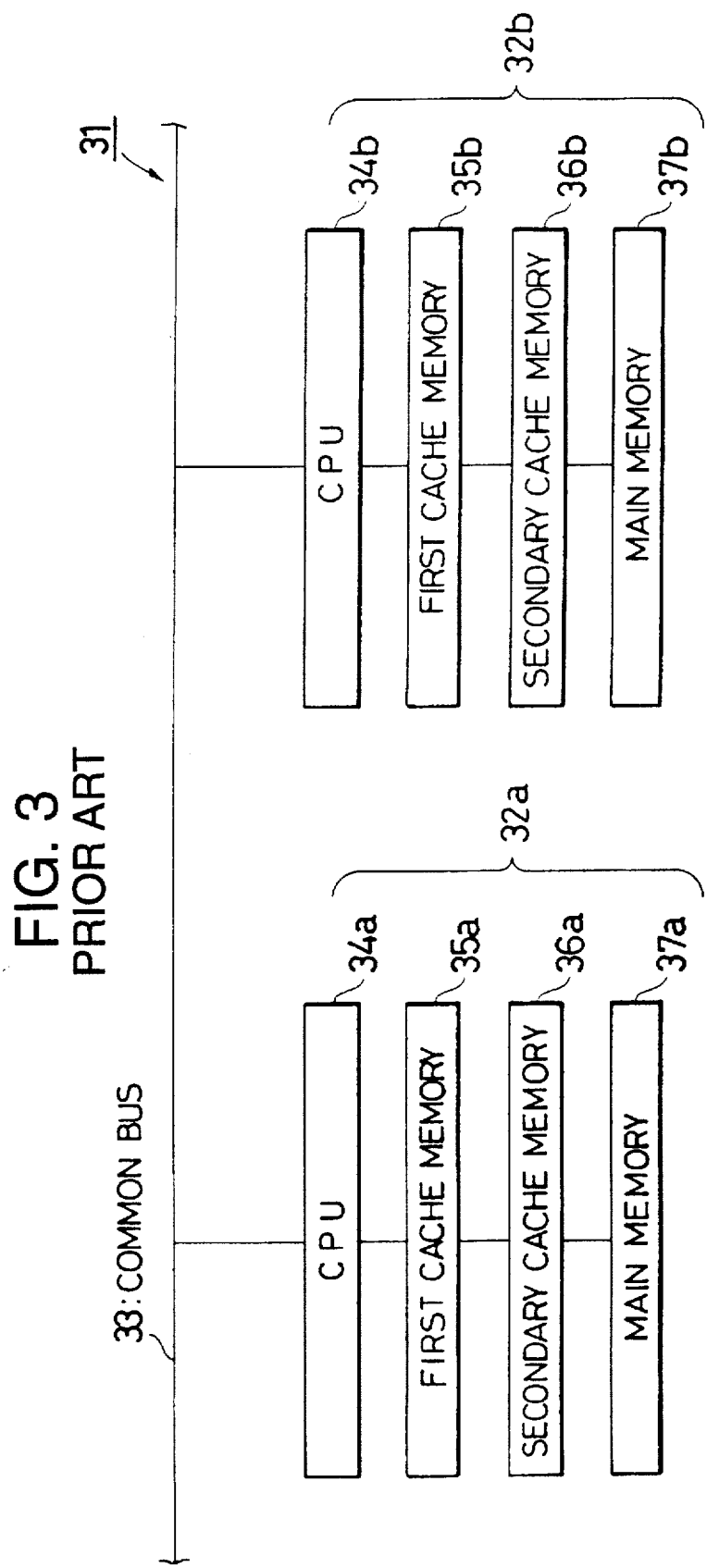

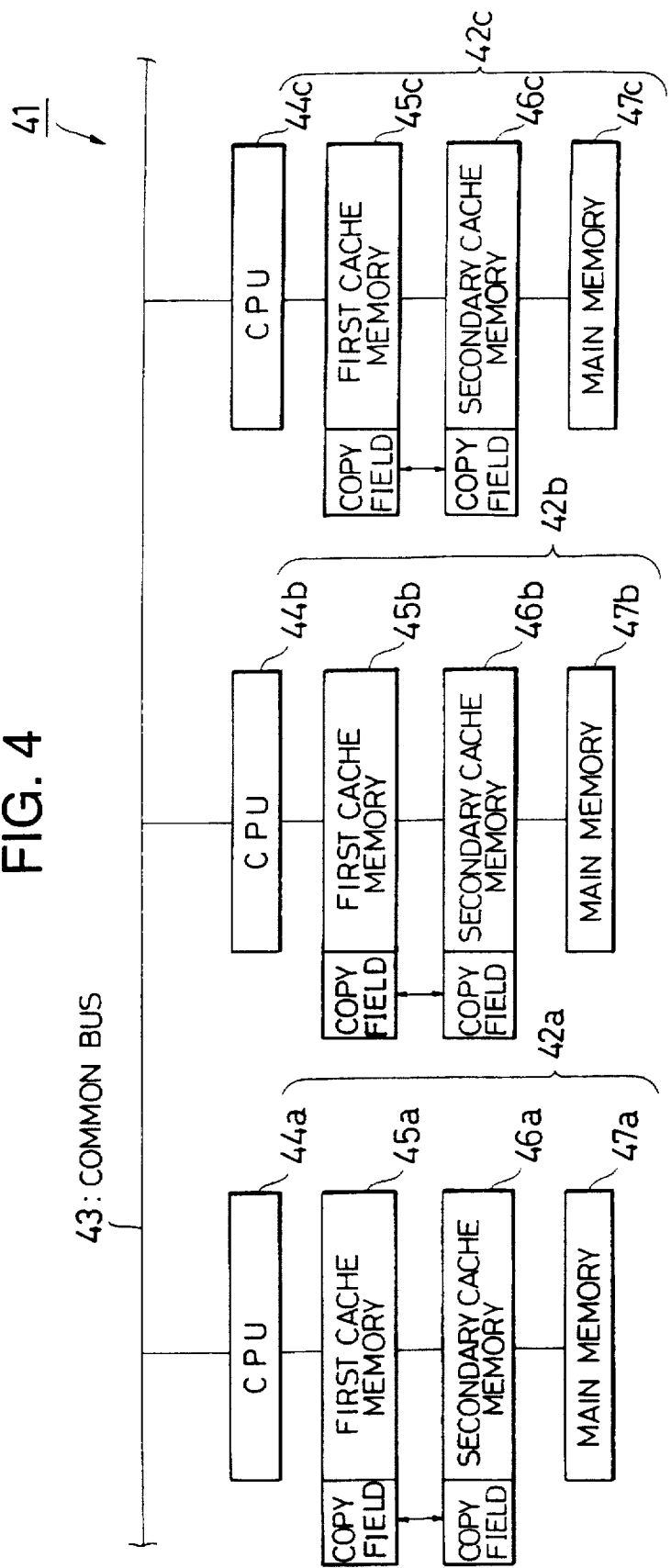

FIG. 5

| FIG. 5A |
|---------|
| FIG. 5B |

FIG. 5A

CPU ACCESS

| PATTERN | CASE | CPU OPERATION | BEFORE OPERATION | | AFTER OPERATION | | REMARKS |
|---------|------|---------------|------------------|-----|-----------------|-----|---------|
| | | | 1ST | 2ND | 1ST | 2ND | |
| 1ST | 1-1 | 1ST:CACHE READ MISS | "I" | "DE" | "CE" | "DE" | REFILLING FROM 2ND |
| | 1-2 | 2ND:CACHE READ HIT | "I" | "DE" | "CE" | "DE" | REFILLING FROM 2ND |
| | 1-3 | | "I" | "S" | "S" | "S" | REFILLING FROM 2ND |
| | 1-4 | | "I" | "DS" | "S" | "DS" | REFILLING FROM 2ND |
| 2ND | 2-1 | 1ST:CACHE READ MISS  2ND:CACHE READ MISS | "I" | "I" | IF(LA·$\overline{S}$) THEN "CE"  ELSE "S" | IF($\overline{LA}$) THEN "DE"  "S" | IF($\overline{LA}$) THEN BUS SNOOPING COHERENT READ |
| | 2-2 | | ANY STATE OTHER THAN "I" | ANY STATE | NOT CHANGED | NOT CHANGED | |
| 3RD | 3-1 | 1ST:CACHE READ HIT | | | | | |

| | | 1ST: WRITE HIT | | | |
|---|---|---|---|---|---|
| 4TH | 4-1 | "CE" | ANY STATE | "DE" | NOT CHANGED |
| | 4-2 | "DE" | ANY STATE | "DE" | NOT CHANGED |
| | 4-3 | "S" | "I" | IF(INV PAGE) THEN "DE" <br> IF(UD PAGE) THEN "DS" | "I" |
| | 4-4 | "S" | ANY STATE OTHER THAN "I" | IF(INV PAGE) THEN "CE" <br> IF(UD PAGE) THEN "S" | "DE" <br> "DS" |
| | 4-5 | "DS" | "I" | IF(INV PAGE) THEN "DE" <br> IF(UD PAGE) THEN "DS" | "I" |
| | 4-6 | "DS" | ANY STATE OTHER THAN "I" | IF(INV PAGE) THEN "CE" <br> IF(UD PAGE) THEN "S" | "DE" <br> "DS" |

| | | 1ST: WRITE BACK <br> 2ND: WRITE HIT | | | |
|---|---|---|---|---|---|
| 5TH | 5-1 | "CE" | ANY STATE OTHER THAN "I" | "I" | NOT CHANGED | WRITE-BACK IS NOT REQUIRED |
| | 5-2 | "DE" | ANY STATE OTHER THAN "I" | "I" | "DE" | WRITE BACK TO 2ND |
| | 5-3 | "S" | ANY STATE OTHER THAN "I" | "I" | NOT CHANGED | WRITE-BACK IS NOT REQUIRED |
| | 5-4 | "DS" | ANY STATE OTHER THAN "I" | "I" | "DS" | WRITE BACK TO 2ND |

1ST : FIRST CACHE MEMORY
2ND : SECONDARY CACHE MEMORY

| FIG. 6A |
|---------|
| FIG. 6B |

FIG. 6A

CPU ACCESS

| PATTERN | CASE | CPU OPERATION | BEFORE OPERATION 1ST | BEFORE OPERATION 2ND | AFTER OPERATION 1ST | AFTER OPERATION 2ND | REMARKS |
|---------|------|---------------|----------------------|----------------------|---------------------|---------------------|---------|
| 6TH | 6-1 | 1ST: WRITE BACK<br>2ND: WRITE MISS | "CE" | "I" | IF(V·D) THEN "I" ELSE "I" | "I" | WRITE-BACK IS NOT REQUIRED WRITE BACK TO 2ND |
|  | 6-2 |  | "DE" | "I" | IF(V·D) THEN "I" ELSE "I" | "CE" | IF (LA) THEN LOCAL MEMORY WRITE ELSE BUS WRITE WRITE BACK TO 2ND |
|  | 6-3 |  | "S" | "I" | IF(V·D) THEN "I" ELSE "I" | "DE" | WRITE-BACK IS NOT REQUIRED WRITE BACK TO 2ND |
|  | 6-4 |  | "DS" | "I" | IF(V·D) THEN "I" ELSE "I" | "S" | IF (LA) THEN LOCAL MEMORY WRITE ELSE BUS WRITE WRITE BACK TO 2ND |
| 7TH | 7-1 | 2ND: WRITE BACK<br>1ST: WRITE MISS | "I" | "CE" | "CE" | "I" | WRITE BACK TO 1ST |
|  | 7-2 |  | "I" | "DE" | "DE" | "I" | WRITE BACK TO 1ST |
|  | 7-3 |  | "I" | "S" | "S" | "I" | WRITE BACK TO 1ST |
|  | 7-4 |  | "I" | "DS" | "DS" | "I" | WRITE BACK TO 1ST |

| 8TH | | 2ND: WRITE BACK 1ST: WRITE HIT | ANY STATE | "CE" | NOT CHANGED | "1" | WRITE-BACK IS NOT REQUIRED |
|---|---|---|---|---|---|---|---|
| | 8-1 | | | | | | |
| | 8-2 | | "CE" | "DE" | "DE" | "1" | COPY ENTRY STATE TO 1ST |
| | 8-3 | | "DE" | "DE" | "DE" | "1" | WRITE-BACK IS NOT REQUIRED |
| | 8-4 | | ANY STATE | "S" | NOT CHANGED | "1" | WRITE-BACK IS NOT REQUIRED |
| | 8-5 | | "S" | "DS" | "DS" | "1" | COPY ENTRY STATE TO 1ST |
| | 8-6 | | "DS" | "DS" | "DS" | "1" | WRITE-BACK IS NOT REQUIRED |

1ST: FIRST CACHE MEMORY
2ND: SECONDARY CACHE MEMORY

FIG. 6B

METHOD FOR PROCESSING DATA BY UTILIZING HIERARCHICAL CACHE MEMORIES AND PROCESSING SYSTEM WITH THE HIERARCHIACAL CACHE MEMORIES

This application is a continuation of application Ser. No. 07/875,027, filed Apr. 28, 1992, now abandoned.

BACKGROUND OF THE INVENTION

1. Field of the Invention

The present invention relates to a method for processing data by utilizing hierarchical cache memories and a processing system with the hierarchical cache memories which are utilized for a system provided with multiple processors, and, in particular, to a method for processing data by utilizing hierarchical cache memories and a processing system with the hierarchical cache memories in which new protocols are utilized for improving a hit rate, CPU execution time, and system performance.

2. Description of Background

Recently, the performance of a central processing unit (CPU) has been greatly improved. That is, the calculation is operated at high speeds. Therefore, peripheral equipment for utilizing the CPU's performance are required, such as a storage devices. Storage devices are required to operate at high access speed. In addition, storage devices with large memory capacities are required. However, storage devices satisfying both the high access speed and the large memory capacity are very expensive. Therefore, a cache memory is used with a main memory to utilize the CPU's performance. In this case, the cache memory has a small memory capacity and is operated at the high access speeds, while main memory has a large memory capacity and is operated at low access speeds.

FIG. 1 is a block diagram of a conventional processing system with a single cache memory.

As shown in FIG. 1, a conventional processing system 11 comprises:
- a central processing unit (CPU) 12 for processing data at high access speeds;
- a main memory 13 with a large memory capacity for storing large pieces of data processed in the CPU 12 in corresponding entries, the data in the main memory 13 being read out at low access speed or the data being written back to the main memory 13 at the low access speed, by the instructions of the CPU 12; and a cache memory 14 with a small memory capacity is arranged between the CPU 12 and the main memory 13 for storing pieces of data in corresponding entries,
  (1) the data in the cache memory 14 being read out at high access speeds and
  (2) up-to-date data calculated in the CPU 12 being written back to a corresponding entry of the cache memory 14 at the high access speeds by the instruction of the CPU 12.

Each entry is stored in a corresponding entry field of the cache memory 14 or in the main memory 13. Each entry field is provided with tag and block fields in which a tag number and a block number are written to indicate the address of the stored data, and a word field in which the data is written.

In the above configuration, parts of pieces of data stored in the main memory 13 are written in the cache memory 14 because the memory capacity of the cache memory 14 is smaller than that of the main memory 13. Therefore, for example, the data stored in an entry of the cache memory 14 initially agree with the data stored in a corresponding entry of the main memory 13 because the entries with the data stored In the main memory 13 are initially filled in the cache memory 14. In this case, the entries frequently utilized in the CPU 12 are filled in the cache memory 14. Therefore, the operation in the processing system 11 is normally implemented at the high access speeds between the CPU 12 and the cache memory 14. In detail, the CPU 12 accesses to an entry of the cache memory 14 to read out data of the entry. In cases where the accessed entry is stored in the cache memory 14, a cache read hit occurs so that the data is processed in the CPU 12.

In cases where data D1 of an entry E1 stored in an entry field F1 of the cache memory 14 are processed In the CPU 12 to vary the data D1, the varied data D2 (that is, the up-to-date data D2) is exchanged with the data D1 stored in the entry E1 of the cache memory 14. In other words, the varied data D2 are written in the cache memory 14 by a write hit. In this case, the old data D1 stored in the main memory 13 is not changed with the varied data D2 so that the operation implemented between the cache memory 14 and the main memory 13 at the low access speed can be avoided. Thereafter, the operation in CPU 12 is continued by utilizing the varied data D2 stored in the entry E1 of cache memory 14 at the high access speeds.

Accordingly, the operation in the processing system 11 can be implemented at high speed without frequently accessing to the main memory 13 in which the operation is implemented at low access speed.

However, when an entry E2 is accessed by the CPU 12, the entry E2 sometimes does not exist in the cache memory 14 because the memory capacity of the cache memory 14 is smaller than that of the main memory 13. In this case, for example, the varied data D2 of the entry E1 stored in the entry field F1 of the cache memory 14 is written back to a corresponding entry of the main memory 13 at the low access speed, and the entry E1 stored in the cache memory 14 is changed with the new entry E2 with new data D3 at the low access speed. That is, the new entry E2 is stored in the entry field F1 of the cache memory 14. These operations are controlled by CPU12.

Therefore, the new data D3 is stored in the entry E2 of the cache memory 14. Thereafter, the new data D3 stored in the entry E2 is read out to the CPU 12 at the high access speed.

Accordingly, the operation in the processing system 11 cannot be continuously implemented at high speeds because the memory capacity of the cache memory 14 is smaller than that of the main memory 13. That is, the CPU execution time in the processing system 11 substantially deteriorates.

Next, another conventional processing system in which a plurality of cache memories are provided to increase the memory capacity is described with reference to FIG. 2.

FIG. 2 is a block diagram of a conventional processing system with two cache memories.

As shown in FIG. 2, a conventional processing system 21 comprises:
- a central processing unit (CPU) 22 for processing data at high speeds;
- a main memory 28 with a large memory capacity for storing large pieces of data processed by the CPU 22 in corresponding entries,
  (1) the data in the main memory 23 being read out at low access speeds, and
  (2) up-to-date data calculated in the CPU 22 being written back to the main memory 23 at the low access speeds by the instruction of the CPU 23;

a first cache memory 24 with a small memory capacity connected with the CPU 22 for storing pieces of data in corresponding entries,
  (1) the data in the cache memory 24 being read out at the high access speed, and
  (2) up-to-date data calculated in the CPU 22 being written back to the cache memory 24 at the high access speed by the instruction of the CPU 22: and
a secondary cache memory 25 with a medium memory capacity arranged between the first cache memory 24 and the main memory 23 for storing pieces of data in corresponding entries,
  (1) the data in the cache memory 25 being read out at medium access speed, and
  (2) up-to-date data calculated in the CPU 22 being written back to the cache memory 25 at the medium access speed by the instruction of the CPU 22.

The memory capacity of the secondary cache memory 25 is larger than that of the first cache memory 24 and is smaller than that of the main memory 23. On the other hand, the access speed to the secondary cache memory 25 is lower than that to the first cache memory 24 and is faster than that to the main memory 23.

In the above configuration, the entries with the data stored in the main memory 23 are written in corresponding entry fields of the cache memories 24 and 25. Therefore, for example, the data stored in an entry of the first cache memory 24 initially agree with the data stored in a corresponding entry of the main memory 23. Also, the data stored in an entry of the secondary cache memory 25 initially agree with the data stored in a corresponding entry of the main memory 23. In this case, the entries frequently utilized in the CPU 22 are stored in the cache memories 24 and 25.

In cases where data D4 of an entry E3 stored in an entry field F3 of the first cache memory 24 are processed in the CPU 22 to vary the data D4 to data D5, the varied data D5 replaces the data D4 stored in the entry E3 of the first cache memory 24. In other words, the varied data D5 are written in the first cache memory 24 by a write hit. In this case, the old data D4 stored in the main memory 23 is not replaced with the varied data D5 in the same manner as in the processing system 11. Thereafter, the operation in the CPU 22 is continued.

Therefore, the operation in the processing system 21 is normally implemented at the high access speed between the CPU 22 and the first cache memory 24.

In addition, when an entry E4 does not exist in any entry field of the first cache memory 24 when the CPU 22 accesses to the entry E4 in the first cache memory 24 the entry E4 is filled with data from the secondary cache memory 25 in cases where the entry E4 exists in the secondary cache memory 25. Therefore, the CPU 22 can read out the data in the entry E4 from the first cache memory 24. This operation will be described in detail in cases 1-1 to 1-4 shown in FIG. 5A. or, in cases where the entry E4 does not exists in the secondary cache memory 25, the entry E4 is filled with data from the main memory 23 to the first and secondary cache memories 24 and 25. Therefore, the CPU 22 can read out the data of the entry E4 from the first cache memory 24. This operation will be described in detail in cases 2-1 to 2-2 shown in FIG. 5A.

In the above operations, the CPU 22 reads the data from the first cache memory 24. On the other hand, a write-back operation is also implemented in the processing system 21. That is, when an entry field F5 of the first cache memory 24, in which an entry E5 has been stored, is required to store an entry E6 for some reason, the entry E5 with data is written back to the secondary cache memory 25 to store the entry E5 with the data in the secondary cache memory 25 because the memory capacity of the secondary cache memory 25 is larger than that of the first cache memory 24. Thereafter, the entry E6 with data stored in the main memory 23 is written in the entry field F5 of the first cache memory 24.

In addition, when an entry field F7 of the secondary cache memory 25 in which an entry E7 has been stored is required to store an entry E8 for some reason, the entry E7 with data is written back to the main memory 23 at the low access speed to store the entry E7 with the data in the main memory 23 regardless of whether or not the entry field of the first cache memory 24 is being utilized. Thereafter, the entry E8 with data stored in the main memory 23 is written in the entry field F7 of the secondary cache memory 25. This is called a first conventional write-back operation in this specification.

Accordingly, because the entry E7 with data of the secondary cache memory 25 is written back to the main memory 23 at the low access speed in cases where the entry field of the first cache memory 24 is being utilized, the CPU execution time is substantially increased so that the system performance deteriorates.

Moreover, there is a case that data of an entry E9 in the first cache memory 24 agrees with data of the entry E9 in the secondary cache memory 25. In the above condition, the data of the entries E9 stored in the first and secondary cache memories 24 and 25 is up-to-date data when the data is provided from the CPU 22 after the operation in the CPU 22 is implemented.

In this case, the up-to-date data of the entry E9 in the secondary cache memory 25 is written back to the main memory 23 at the low access speed to utilize an entry field F9 storing the entry E9 in the secondary cache memory 25 for the other entry. This is called a second conventional write-back operation in this specification.

Accordingly, because the up-to-date data in the secondary cache memory 25 is written back to the main memory at the low access speed although the up-to-date data is stored in the first cache memory 24, the CPU execution time is substantially increased so that the system performance deteriorates.

Next, two types of methods for arranging the entries in the cache memory 14, 24, or 25 are described with One relation between each entry arranged in the main memory 13, or 23 and each entry arranged in the cache memory 14, 24, or 25 is a direct map method.

Each entry $Ei (i=1, 2, \ldots)$ is stored in an entry field $Efi$ of the main memory arranged at an entry field $Fj$ ($j=0, 1, 2$) of the cache memory. Here, the value $j$ is the remainder obtained $j=(i \mod 128)41$ in cases where the block field in the entry field consists of 7 bits.

Accordingly, the construction of the cache memory is simple because the number of hard-wires connecting the entry fields between the main memory and the cache memory is small. On the other hand, a hit rate is decreased because the entry fields in the cache memory are not efficiently utilized. The hit rate means the probability that the entry accessed by the CPU exists in the cache memory.

Another relation between each entry arranged in the main memory 13, or 23 and each entry arranged in the cache memory 14, 24, or 25 according to a set associative method.

All entry fields in the cache memory 14, 24, or 25 are divided into 64 ($2^6$) sets in cases where the block field in the entry field consists of 6 bits. Therefore, a plurality of entry fields exist in each set of the cache memory. Thereafter, each entry Ei stored in the entry field Efi of the main memory is arranged at an arbitrary entry field in the set number j of the cache memory. Here, the value j is $i=(i \mod 64)41$.

Accordingly, the hit rate is better because the entry fields in the cache memory are efficiently occupied by the entries. On the other hand, the construction of the entries in the cache memory is complicated because a large number of hard-wires connecting the entry fields between the main memory and the cache memory is required.

In general, in cases where the number of the entry fields existing in each set of the cache memory is two in the set associative method, the method is called a 2-way set associative method. Also, when the number of fields is four, the method is called a 4-way set associative method. These methods are utilized for embodiments shown in FIGS. 7 and 8.

Next, the relation between each entry stored in the first cache memory 24 and each entry stored in the secondary cache memory 25 is described.

In a multi-inclusion method, the entries stored in the first cache memory 24 are necessarily stored in the secondary cache memory 25. On the other hand, the entries stored in the first cache memory 24 are not necessarily stored in the secondary cache memory 25 in a non-multi-inclusion method.

In cases where the multi-inclusion method is adopted in the processing system 21, as is well known, the entries in the first and second cache memories 24, 25 must be arranged according to the direct map method.

Accordingly, the hit rate deteriorates in the processing system 21 in cases where the multi-inclusion method is adopted.

On the other hand, in cases where the non-multi-inclusion method is adopted in the processing system 21, the entries in the first and second cache memories 24, 25 can be arranged according to the set associative method.

However, a large number of hard-wires is required in the processing system 21 so that the system 21 becomes large.

Next, a processing system with hierarchical cache memories which is utilized for a computer system provided with multiple processors is described.

FIG. 3 is a block diagram of a conventional computer system with multiple processors.

As shown in FIG. 3, a conventional computer system 31 comprises a plurality of processing systems with hierarchical memories 32 (32a, 32b, . . . ) and a common bus 33 connecting the processing system 32 in parallel for transmitting data from one system 32 to the other systems. Each processing system with hierarchical memories 32a comprises a CPU 34a, a first cache memory 35a, a secondary cache memory 36a, and a main memory 37a in the same manner as in the processing system 21 shown in FIG. 2.

All entries required for implementing the operation in the CPU 34a are not necessarily stored in the main memory 37a. In other words, a part of entries required by the CPU 34a are stored in the main memory 37b of the other processing system 32b.

In the above configuration, there is a case that an entry E10 accessed by the CPU 34a is not stored in the main memory 37a. This case is called "a cache read miss". In this case, the information of the cache read miss is transmitted to the common bus 33. In addition, each processing system 32 always supervises information on the common bus 33 by bus snooping.

Therefore, a specific processing system 32b of which the main memory 37b stores the entry E10 accessed by the CPU 34a detects the information of the cache read miss so that the data of the entry E10 stored in the specific processing system 32 is transmitted to the CPU 34a through the common bus 33.

On the other hand, in cases where the entry E7 stored in the secondary cache memory 36a does not exist in the main memory 37a in the conventional first and second write-back operations shown in FIG. 2, the up-to-date data of the entry E7 is written back to the main memory 37b of the processing system 32b through the common bus Accordingly, the common bus 33 is crowded by the transmission of the data in the write-back operation so that the performance of the computer system 31 deteriorates.

SUMMARY OF THE INVENTION

A first object of the present invention is to provide, with due consideration to the drawbacks of such conventional processing method, a method for processing data by utilizing hierarchical cache memories in which the system performance of a system for processing data is improved.

A second object of the present invention is to provide a processing system with hierarchical cache memories in which the above method is easily implemented.

The first object is achieved by the provision of a method for processing data by utilizing hierarchical cache memories, comprising the steps of:

preparing a main memory for storing large pieces of data, the data being read from and being written to the main memory at a low access speed;

preparing a plurality of cache memories hierarchically arranged in series for respectively storing a part of the data stored in the main memory in corresponding entries,
  (1) the lowest cache memory being connected with the main memory, and
  (2) each entry being stored in an entry field of the cache memory;

preparing a processing unit connected with the highest cache memory, two operations being implemented by the processing unit;

implementing a first operation by
  (1) filling an entry E1 with data stored in the main memory in the highest cache memories,
  (2) reading out the data of the entry E1 filled in the highest cache memory at a high access speed after a cache read hit occurs at the highest cache memory,
  (3) processing the data read out from the highest cache memory in the processing unit, and
  (4) writing up-to-date data in the entry E1 of the highest cache memory at the high access speed, the up-to-date data being obtained by processing the data read out from the highest cache memory; and implementing a second operation by
  (1) writing up-to-date data processed in the processing unit in an entry E2 of a lower cache memory M1 at a medium access speed,
  (2) instructing the lower cache memory M1 to write back the up-to-date data to a corresponding entry in an upper cache memory M2 before a write miss occurs at the upper cache memory M2,
  (3) invalidating an entry E8 stored in the upper cache memory M2 to select the entry E3 in cases where no invalidated entry exists in the upper cache memory M2,
  (4) selecting an invalidated entry E3 stored in the upper cache memory M2 in cases where one or more invalidated entries exist in the upper cache memory M2,
  (5) writing back the entry E2 with the up-to-date data stored in the lower cache memory M1 to an entry field of the upper cache memory M2 in which the selected entry E3 is stored to replace the entry E8 with the entry E2 at the medium access speed, and (6) invalidating the entry E2 of the lower cache memory M1 to indicate that the up-to-date data of the entry E2 in the lower cache memory M1 is invalid.

In the above steps of the method, the first operation is implemented as the same manner as in the conventional method.

Next, the second operation is described. In cases where all the entry fields in the lower cache memory M1 are occupied by entries, there is a case that entry is required to store in an entry field in the cache memory M1 for some reason. In this case, an entry E2 in the upper cache memory M2 is accessed to write back the data of the entry E2 in the lower cache memory M1 to the upper cache memory M2.

However, when a write miss occurs at the upper cache memory M2 because either the entry E2 does not exist in the upper cache memory M2 or the state of the entry E2 in the upper cache memory M2 is invalid, an entry E3 in the upper cache memory M2 is selected. Thereafter, the entry E2 of the lower cache memory M1 is written back to an entry field storing the selected entry E3 in the upper cache memory M2 at the medium access speed. That is, the entry E3 in the entry field is replaced with the entry E2. Thereafter, the entry E2 in the lower cache memory M1 is invalidated so that the other entries can be stored in an entry field storing the invalidated entry E2 in the lower cache memory M1.

Conventionally, the entry E2 of the lower cache memory M1 is written back to the main memory at the low access speed regardless of whether entry fields of the upper cache memory M2 can be utilized. However, the entry fields of the upper cache memory M2 can be efficiently utilized at the medium access speed in the present invention.

Accordingly, the CPU execution time can be substantially improved.

Moreover, the first object is achieved by the provision of a method for processing data by utilizing hierarchical cache memories, comprising the steps of:

preparing a main memory for storing large pieces of data, the data being read from and being written to the main memory at low access speed;

preparing a plurality of cache memories hierarchically arranged in series for respectively storing a part of the data stored in the main memory in corresponding entries, (1) the lowest cache memory being connected with the main memory, (2) each entry being stored in an entry field of the cache memory, and (3) each entry being provided with state information indicating a type of entry state;

preparing a processing unit connected with the highest cache memory, two operations being implemented by the processing unit;

implementing the first operation by (1) refilling an entry E1 with data stored in the main memory in the highest cache memories, (2) reading out the data of the entry E1 filled in the highest cache memory at high access speed after a cache read hit occurs in the entry E1 of the highest cache memory, (3) processing the data read out from the highest cache memory in the processing unit, and (4) writing up-to-date data in the entry E1 of the highest cache memory at the high access speed, the up-to-date data being obtained by processing the data read out from the highest cache memory; and implementing the second operation by (1) instructing both an upper cache memory and a lower cache memory to store an entry E3 with up-to-date data processed by the processing unit, (2) setting the state of the entry E3 in the upper cache memory to a clean state indicating that the up-to-date data of the entry E3 in the upper cache memory agrees with a corresponding piece of data in the main memory, the clean state of the entry E3 in the upper cache memory being indicated by the state information of the entry E3, (3) setting the state of the entry E3 in the lower cache memory to a dirty state indicating that the up-to-date data of the entry E3 in the lower cache memory does not agree with a corresponding piece of data in the main memory, the dirty state of the entry E3 in the lower cache memory being indicated by the state information of the entry E3, (4) copying the state information of the entry E3 stored in the lower cache memory to the entry E3 stored in the higher cache memory at the medium access speed, and (5) invalidating the entry E3 of the lower cache memory to indicate that the data of the entry E3 in the lower cache memory is invalid, the invalid state of the entry E3 in the lower cache memory being indicated by the state information of the entry E3.

In the above steps of the method, the first operation is implemented as the same manner as in the conventional method.

Next, the second operation is described. An entry E3 with data is shared in both an upper cache memory M3 and a lower cache memory M4 in an ordinary process. In this case, the state information of the lower cache memory M4 is set to "dirty" indicating that the data in the lower cache memory M4 does not agree with the data in the main memory. On the other hand, the state information of the upper cache memory M3 is set to "clean" indicating that the data in the upper cache memory M3 agrees with the data in the main memory although the data in the lower cache memory M4 does not really agree with the data in the main memory.

In the above condition, in cases where all the entry fields in the lower cache memory M4 are occupied by the entries, there is a case that another entry is required to store in an entry field in the lower cache memory M4 for some reason. In this case, an entry in the upper cache memory M3 is accessed. When a write hit occurs in the entry E3 of the upper cache memory M3, the entry information of the entry E3 in the lower cache memory M4 is copied to the entry E3 in the upper cache memory M3 at the medium access speed. Thereafter, the entry E3 in the lower cache memory M1 is invalidated to store the other entries.

Conventionally, the entry E3 of the lower cache memory M4 is written back to the main memory at the low access speed.

Accordingly, the CPU execution time can be substantially improved.

The second object is achieved by the provision of a processing system with hierarchical cache memories comprising:

a main memory for storing large pieces of data, the data being read from and being written to the main memory at low access speed;

a plurality of cache memories hierarchically arranged in series for respectively storing a part of the data stored in the main memory in corresponding entries, (1) the lowest cache memory being connected with the main memory,
(2) each piece of data stored in the main memory being stored in an entry field of the cache memory, and
(3) each entry being provided with state information indicating a type of entry state;

a processing unit connected with the highest cache memory for
(1) writing up-to-date data processed in the processing unit in an entry E1 of a lower cache memory M1 at medium access speed,
(2) instructing the lower cache memory M1 to write back the up-to-date data to a corresponding entry in an upper cache memory M2 before a write miss occurs at the upper cache memory M2,
(3) invalidating an entry E2 stored in the upper cache memory M2 to select the entry E2 in cases where no invalidated entry exists in the upper cache memory M2,
(4) selecting an invalidated entry E2 stored in the upper cache memory M2 in cases where one or more invalidated entries exist in the upper cache memory M2,
(5) writing back the entry E1 with the up-to-date data stored in the lower cache memory M1 to an entry field of the upper cache memory M2 in which the selected entry E2 is stored to replace the entry E2 with the entry E1 at the medium access speed,
(6) invalidating the entry E1 of the lower cache memory M1 to indicate that the up-to-date data of the entry E1 in the lower cache memory M1 is invalid,
(7) instructing both a lower cache memory M3 and an upper cache memory M4 to store an entry E3 with up-to-date data processed by the processing unit,
(8) setting the state of the entry E3 in the upper cache memory M4 to a clean state indicating that the up-to-date data of the entry E3 in the upper cache memory M4 agrees with a corresponding piece of data in the main memory, the clean state of the entry E8 in the upper cache memory M4 being indicated by the state information of the entry E8,
(9) setting the state of the entry E8 in the lower cache memory M3 to a dirty state indicating that the up-to-date data of the entry E8 in the lower cache memory M3 does not agree with a corresponding piece of data in the main memory, the dirty state of the entry E3 in the lower cache memory M3 being indicated by the state information of the entry E3,
(10) copying the state information of the entry E8 stored in the lower cache memory M3 to the entry E3 stored in the higher cache memory at the medium access speed, and
(11) invalidating the entry E3 of the lower cache memory M3 to indicate that the data of the entry E3 in the lower cache memory M3 is invalid, the invalid state of the entry E3 in the lower cache memory M3 being indicated by the state information of the entry E3.

In the above configuration, the method for processing data by utilizing hierarchical cache memories is easily implemented.

BRIEF DESCRIPTION OF THE DRAWINGS

FIG. 3 is a block diagram of a conventional computer system with multiple processors.

FIG. 4 is a block diagram of a computer system with multiple processors, each multiple processor consisting of a processing system with hierarchical memories.

FIGS. 5A, 5B show the change of the entry state in the cache memories in tabular form, the first to fifth patterns being displayed.

FIGS. 6A, 6B show the change of the entry state in the cache memories in tabular form, the sixth to eighth patterns being displayed.

DETAILED DESCRIPTION OF THE PREFERRED EMBODIMENTS

Figure 1:
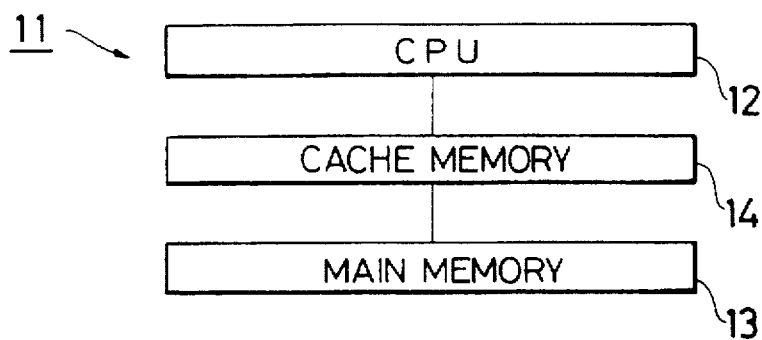
FIG. 1 is a block diagram of a conventional processing system with a cache memory.
Figure 2:
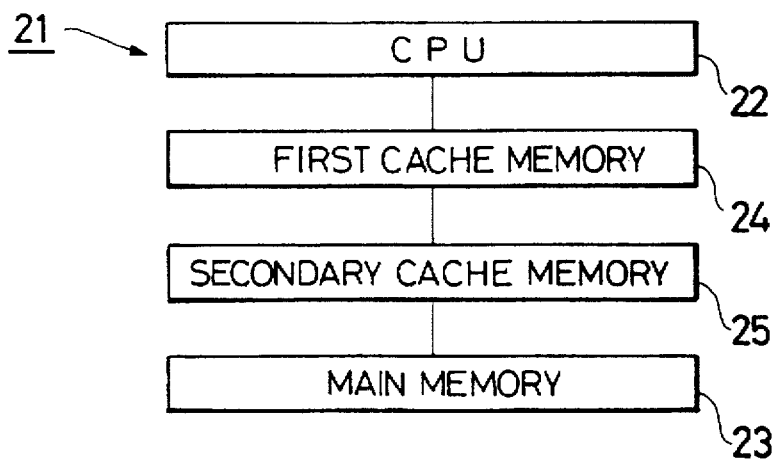
FIG. 2 is a block diagram of another conventional processing system with hierarchical cache memories.

Preferred embodiments of a processing system with hierarchical memories according to the present invention are described with reference to drawings.

FIG. 4 is a block diagram of a computer system with multiple processors, each multiple processor consisting of a processing system with hierarchical memories.

As shown in FIG. 4, a computer system 41 comprises:
a plurality of processing system with hierarchical memories 42 (42a, 42b, . . . ), and
a common bus 43 connecting the processing systems with hierarchical memories 42 in parallel for transmitting data from one processing system 42 to the other processing systems 42.

Each processing system with hierarchical memories 42 comprises:
a CPU 44 (44a, 44b, . . . ) for processing pieces of data at high access speed;
a first cache memory 45 (45a, 45b, . . . ) with a small memory capacity connected with the CPU 44 for storing pieces of data in corresponding entries,
(1) the data stored in the first cache memory 45 being read out to the CPU 44 at the high access speed, and
(2) the data varied in the CPU 44 being written back to the first cache memory 45 at the high access speed;
a secondary cache memory 46 (46a, 46b, . . . ) with a medium memory capacity connected with the first cache memory 45 for storing pieces of data in corresponding entries,
(1) the data stored in the secondary cache memory 46 being written back to the first cache memory 45 at a medium access speed by the instruction of the CPU 44 if necessary, and
(2) the data stored in the first cache memory 45 being written back to the second cache memory 46 at the medium access speed under the instruction of the CPU 44 if necessary; and
main memory 47 (47a, 47b, . . . ) with a large memory capacity for storing large pieces of data processed in the CPU 44 in corresponding entries, (1) the data stored in the main memory 47 being filled in the secondary cache memory 46 under the instruction of the CPU 44 if necessary, and (2) the data stored in the secondary cache memory 46 being written back to the main memory 47 under the instruction of the CPU 44 if necessary.

The memory capacity of the secondary cache memory 46 is larger than that of the first cache memory 45 and is smaller than that of the main memory 47. On the other hand, the access speed of the secondary cache memory 46 is lower than that of the first cache memory 45 and is faster than that of the main memory 47.

The entries accessed by the CPU 44 are distributed in the main memories 47 to implement the operation in the CPU 44. That is, the entries accessed by the CPU 44 to implement the operation in the CPU 44a are not necessarily stored in the main memory 47a.

Each entry is stored in an entry field. Each entry field is provided with tag and block fields in which a tag number and a block number are written to indicate an address of the data, a word field in which the data is stored, and a state information field in which a state information for indicating the entry state is stored.

Each cache memory 45, 46 is provided with a copy field in which a copy instruction is stored. The data stored in one cache memory is written back to the other cache memory by implementing the copy instruction of one cache memory. Also, the state information stored in the entry of one cache memory is written back to the other cache memory by implementing the copy instruction of one cache memory.

The state information is utilized to operate the computer system 41 according to an operational protocol in which the data stored in the secondary cache memory 46 is written back to the first cache memory 45 in preference to the main memory 47.

In detail, the entry state can be classified by utilizing three elements. The first element is whether the data stored in the entry is valid or invalid. In cases where the state of the entry is specified to be "valid" by the state information, the data in the entry can be utilized for the CPU 44. On the other hand, in cases where the state of the entry is specified to be "invalid" by the state information, the data in the entry is prohibited from being utilized for the CPU 44 although the entry accessed by the CPU 44 exists.

The second element is whether or not the data of an entry stored in the cache memory 45, or 46 agrees with the data of a corresponding entry stored in the main memory 47. That is, in cases where the data of the cache memory agrees with the data of the main memory 47, the entry state is specified to be "clean" by the state information. On the other hand, in cases where the data of the cache memory does not agree with the data of the main memory 47, the entry state is specified to be "dirty" by the state information.

The third element is whether or not one cache memory 45, or 46 has the same entry as the other cache memory has in the computer system 41. That is, in cases where an entry is shared by a plurality of cache memories, the state of the entry is specified to be "shared" by the state information. On the other hand, in eases where an entry stored in one main memory 47 is assigned to only one cache memory 45, or 46, the state of the entry in one cache memory is specified to be "exclusive" by the state information.

Therefore, the entry state is classified to five types by combining the three elements.

The first type is "invalid". This type is indicated by a symbol "I". In this type, the elements "clean", "dirty", "shared", and "exclusive" have no influence. In addition, in cases where the entry accessed by the CPU 44 does not exist in the cache memory 45, or 46, the entry state of the cache memory is also expressed to be "invalid". This is the special expression method in the present invention.

The second type is "clean and exclusive" indicated by a symbol "CE". This type means that the data of an entry in one cache memory 45, or 46 agrees with the data of a corresponding entry in the main memory 47 and the data is not shared with the other cache memory.

The third type is "dirty and exclusive" indicated by a symbol "DE". This type means that the data of an entry in one cache memory 45, or 46 does not agree with the data of a corresponding entry in the main memory 47 because the data stored in the cache memory 45, or 46 has already been changed with the other data varied in the CPU 44, and the varied data Is not shared in the other cache memory.

The fourth type is "clean and shared" indicated by a symbol "S". This type means that the data of an entry in one cache memory 45, or 46 agrees with the data of a corresponding entry of the main memory 47 and the data is shared with the other cache memory.

The fifth type is "dirty and shared" indicated by a symbol "DS". This type means that the data of an entry in one cache memory 45, or 46 does not agree with the data of a corresponding entry of the main memory 47 and the data of one cache memory is shared with the other cache memory.

In the above configuration of the computer system 41, eight types of basic operations are described with reference to FIGS. 5A, 5B, 6A, and 6B.

FIGS. 5A, 5B show the change of the entry state in the cache memories such as the first and secondary cache memories 45, and 46 in tabular form, the first to fifth patterns being displayed.

The entry state in the cache memory is changed by the operation of the CPU 44 in each processing system with hierarchical memories 42.

FIGS. 6A, and 6B show the change of the entry state in the cache memories in tabular form, the sixth to eighth patterns being displayed.

The entry state in the cache memory is changed by the operation of the CPU 44 in each processing system hierarchical memories 42.

The operations in the computer system 41 according to the first to sixth patterns are the same as that in the conventional computer system 31. On the other hand, the operations according to the seventh and eighth patterns are not implemented in the conventional computer system 31 but implemented in the computer system 41 according to the operational protocol. Moreover, the operations according to the seventh and eighth patterns are implemented based on the operations according to the first to sixth patterns cases 1-1 to 1-4. As shown in FIG. 5A, the operation according to the first pattern is implemented in cases where (1) a cache read miss occurs when the CPU 44 accesses to an entry in the first cache memory 45 to read out the data relating to the entry from the first cache memory 45, and (2) a cache read hit then occurs when the CPU 44 accesses to a corresponding entry in the secondary cache memory 46 to fill the entry with data to the first cache memory 45.

Here, the cache read miss occurs in cases where either the entry accessed by the CPU 44 does not exist in the cache memory or the state of the entry accessed by the CPU 44 is "invalid". In addition, the cache read hit occurs in cases where the state of the entry accessed by the CPU 44 is "clean and exclusive", "dirty and exclusive", "clean and shared", or "dirty and shared" because the data in the entry can be utilized for the CPU 44.

After both the cache read miss and the cache read hit occur, the valid entry of the secondary cache memory 46 is filled into the first cache memory 45 of which the entry state is "invalid". In this case, the data in the secondary cache memory 46 is refilled to the first cache memory 45. Therefore, the data in the first cache memory 45 agrees with the data in the secondary cache memory 46. However, the entry state of the first cache memory 45 can be set at "clean" regardless of whether or not the entry state of the secondary cache memory 46 is "dirty". The reason is because the data stored in the main memory 47 is prepared to be changed by a write-back operation with the second cache memory 46. In other words, the entry state of the first cache memory 45 is not needed to be "dirty".

Cases 2-1:

The operation according to the second pattern is implemented in cases where (1) a cache read miss occurs in the processing system 42a when the CPU 44a accesses to an entry in the first cache memory 45a to read out the data relating to the entry from the first cache memory 45a, and (2) another cache read miss then occurs when the CPU 44a accesses to a corresponding entry in the secondary cache memory 46a to refill the entry with data to the first cache memory 45a.

That is, both the state of both the first and secondary cache memories 45a, 46a are in the "invalid" state.

In this pattern, the condition indicated by a symbol "if (LA)" means that the entry accessed by the CPU 44a exists in the main memory 47a. The condition indicated by a symbol "if ($\overline{LA}$)" means that the entry accessed by the CPU 44a does not exist in the main memory 47a but exists in the main memory 47b. The condition indicated by a symbol "if ($\overline{S}$)" means that the entry accessed by the CPU 44a does not exist in the other main memory 47. Therefore, the condition indicated by a symbol "if (LA+$\overline{S}$)" means that the entry accessed by the CPU 44a exists only in the main memory 47a.

In cases where the condition "if (LA+$\overline{S}$)" is satisfied, both the entry states of the first and secondary cache memories 45a, 46a are changed to "clean and exclusive" after the cache read misses occur because the data stored in the main memory 47a is refilled to both the first and secondary cache memories 45a, 46a. In this case the data in the first cache memory 45a agrees with the data in the secondary cache memory 46a.

Cases 2-2:

On the other hand, in cases where the condition "if (LA+$\overline{S}$) is not satisfied and the condition" if ($\overline{LA}$) "is satisfied", the common bus 43 is supervised by executing a bus snooping to detect the entry accessed by the CPU 44a after the cache read misses occur. Thereafter, when the entry accessed by the CPU 44a is detected on the common bus 43, the detected entry is transmitted to the first and secondary cache memories 45a, 46a at a coherent read. That is, both the entry state of the first and secondary cache memories 45a, 46a are simultaneously changed to "clean and shared" In this case, the data in the first cache memory 45a agrees with the data in the secondary cache memory 46a.

Case 3-1:

The operation according to the third pattern is implemented in cases where a cache read hit occurs when the CPU 44 accesses to an entry in the first cache memory 45 to read out the data relating to the entry from the first cache memory 45. That is, the entry state of the first cache memory 45 is not "invalid". Therefore, the entry states of the first and secondary cache memories 45, 46 are not changed regardless of the entry state of the secondary cache memory 46 because the CPU 44 is operated by utilizing the data stored in the first cache memory 45.

Cases 4-1 and 4-2:

The operation according to the fourth pattern is implemented in cases where a write hit occurs in the processing system 42a when the CPU 44a accesses to an entry in the first cache memory 45a to write back the up-to-date Du, data to be updated calculated in the CPU 44a to the entry in the first cache memory 45a. Here, the write hit occurs in cases where the data Du calculated in the CPU 44a is written back to the first cache memory 45a after the data Do, old data stored in the first cache memory 45a is read out to the CPU 44a according to a cache read hit. Therefore, the entry state of the first cache memory 45a is not "invalid" and the data in the first cache memory 45a is written back to the up-to-date Du.

When the entry state of the first cache memory 45a is "clean and exclusive" or "dirty and exclusive", the entry state of the first cache memory 45a is necessarily set to "dirty and exclusive" regardless of the entry state of the secondary cache memory 46a after the write hit occurs because the up-to-date data Du calculated in the CPU 44a is written back to only the first cache memory 45a and does not agree with the data Do in the main memory 47a. In addition, the change of the entry state in the secondary cache memory 46a is not needed because the data in the secondary cache memory 46a does not agree with the up-to-date data Du.

Cases 4-3:

When the state of the entry E1 in the first cache memory 45a is "clean and shared" and the state of the entry E1 in the secondary cache memory 45a is "invalid", the change of the entry state depends on the conditions indicated by a symbol "if (INV page)" and a symbol "if (UD page)" That is, the symbol "if (INV page)" indicates that the state of the same entry E1 existing in the cache memory 45b, or 46b of the other processing system 42b is changed to "invalid" after the write hit occurs. On the other hand, the symbol "if (UD page)" indicates that the data Do of the same entry E1 stored in the cache memory 45b, or 46b of the other processing system 42b is changed with the up-to-date data Du after the write hit occurs.

Therefore, in cases where the condition "if (INV page)" is satisfied, the entry state of the first cache memory 45a is changed to "dirty and exclusive" because the same entry existing in the cache memory 45b, or 46b of the other processing system with hierarchical memories 42b is invalidated and the up-to-date data Du in the first cache memory 45a does not agree with the data Do in the main memory 47a. In cases where the condition "if (UD page)" is satisfied, the entry state of the first cache memory 45a is changed to "dirty and shared" because the data Do in the same entry stored in the cache memory 45b, or 46b of the other processing system with hierarchical memories 42b is changed with the up-to-date data Du.

In addition, the entry state of the secondary cache memory 46a is kept to "invalid" because the entry field of the secondary cache memory 46a can be utilized for the other entry in a following process.

Case 4-4:

When the entry state of the first cache memory 45a is "clean and shared" and the entry state of the secondary cache memory 45a is not "invalid", the up-to-date data Du is written back to the both first and secondary cache memories 45a, 48a. However, the change of the entry state depends on the conditions indicated by the symbol "if (INV page)" and the symbol "If (UD page)".

In cases where the condition "if (INV page)" is satisfied, the entry state of the secondary cache memory 46a is changed to "dirty" because the up-to-date data Du is stored in the entry of the secondary cache memory 46a to easily write back to the main memory 47a by detecting the entry state "dirty". On the other hand, the entry state of the first cache memory 45a is kept to "clean" because the up-to-date data Du stored in the first cache memory 45a is not important. Therefore, the up-to-date data Du stored in the first cache memory 45a can be easily changed to new up-to-date data in a following process. As a result, the entry state of both the first and secondary cache memories 45a, 46a are changed to "exclusive" although the data in the first cache memory 45a agrees with the data in the second cache memory 46a.

In cases where the condition "if (UD page)" is satisfied, the entry state of the first cache memory 45a is kept to "clean" and the entry state of the secondary cache memory 46a is changed to "dirty" in the same manner as in the condition "if (INV page)" However, because the up-to-date data Du is stored not only in the processing system with hierarchical memories 42a but also in the other processing system with hierarchical memories 42b, the entry state of both the first and secondary cache memories 45a, 46a are set to "shared".

Case 4-5:

When the entry state of the first cache memory 45a is "dirty and shared" and the entry state of the secondary cache memory 45a is "invalid", the new up-to-date data Du is written back to the first cache memory 45a. However, the change of the entry state depends on the conditions indicated by the symbol "if (INV page)" and the symbol "if (UD page)".

In cases where the condition "If (INV page)" is satisfied, the entry state of the first cache memory 45a is changed to "dirty and exclusive" because the same entry existing in the cache memory 45b, or 46b of the other processing system with hierarchical memories 42b is invalidated and the up-to-date data Du stored in the first cache memory 45a is changed with new up-to-date data Dnu differing from the data Do.

In cases where the condition "if (UD page)" is satisfied, the entry state of the first cache memory 45a is changed to "dirty and shared" because the up-to-date data Du of the same entry stored in the cache memory 45b, or 46b of the other processing system with hierarchical memories 42b is changed with the new up-to-date data Dnu.

In addition, the entry state of the secondary cache memory 46a is kept to "invalid" because the entry field of the secondary cache memory 46a can be utilized for the other entry.

Case 4-6:

When the entry state of the first cache memory 45a is "dirty and shared" and the entry state of the secondary cache memory 45a is not "invalid", the new up-to-date data Du is written back to the both first and secondary cache memories 45a, 46a. However, the change of the entry state depends on the conditions indicated by the symbol "if (INV page)" and the symbol "if (UD page)".

In cases where the condition "if (INV page)" is satisfied, the entry state of the secondary cache memory 46a is changed to "dirty" because the new up-to-date data Dnu is stored in the entry of the secondary cache memory 46a to easily write back to the main memory 47a by detecting the entry state "dirty". On the other hand, the entry state of the first cache memory 45a is kept to "clean" because the new up-to-date data Dnu stored in the first cache memory 45a is not important. Therefore, the new up-to-date data Dnu stored in the first cache memory 45a can be easily changed to the other up-to-date data in a following process. As a result, the entry state of both the first and secondary cache memories 45a, 46a are changed to "exclusive" although the data in the first cache memory 45a agrees with the data in the second cache memory 46a.

In cases where the condition "if (UD page)" is satisfied, the entry state of the first cache memory 45a is kept to "clean" and the entry state of the secondary cache memory 46a is changed to "dirty" in the same manner as in the condition "if (INV page)". However, because the new up-to-date data Dnu is stored not only in the cache memories 45a, 46a of the processing system with hierarchical memories 42a but also in the cache memory 45b, or 46b of the other processing system with hierarchical memories 42b, the entry state of both the first and secondary cache memories 45a, 46a are set to "shared".

Cases 5-1 and 5-3:

The operation according to the fifth pattern is implemented in cases where (1) the CPU 44 instructs the first cache memory 45 to write back the data of an entry in the first cache memory 45 to the secondary cache memory 46, and (2) a write hit occurs when the CPU 44 accesses to a corresponding entry in the secondary cache memory 46 to write back the data of the entry stored in the first cache memory 45 to the secondary cache memory 46.

That is, the entry in both the first and secondary cache memories 45, 46 is not in the "invalid" state.

Generally, in cases where the data of an entry can be stored in both the first and secondary cache memories 45, 46, the data is stored in the entry of the first cache memory 45. However, in cases where all entry fields in the first cache memory 45 has been occupied by the other entries, a write-back operation from the first cache memory 45 to the secondary cache memory 46 is required to write back the data.

When the entry state of the first cache memory 45 is either "clean and exclusive" or "clean and shared" and the entry state of the secondary cache memory 46 is not "invalid", the write-back 1s not implemented and the entry state of the first cache memory 45 is changed to "invalid". The reason is because the up-to-date data is stored in the entry of the secondary cache memory 46 and the data of the entry in the first cache memory 45 is unnecessary. Therefore, the entry field in the first cache memory 45 can be utilized for the other entry in a following process.

Cases 5-2 and 5-4:

When the entry state of the first cache memory 45 is either "dirty and exclusive" or "dirty and shared" and the entry state of the secondary cache memory 46 is not "invalid", the write-back is implemented from the first cache memory 45 to the secondary cache memory 46 and the entry state of the first cache memory 45 is changed to "invalid" because the up-to-date data is stored in the entry of the first cache memory 45. Therefore, the entry field in the first cache memory 45 can be utilized for the other entry in a following process.

Cases 6-1 and 6-3:

The operation according to the sixth pattern is implemented in cases where (1) the CPU 44 instructs the first cache memory 45 to write back the data of an entry in the first cache memory 45 to the secondary cache memory 46, and (2) a write miss occurs when the CPU 44 accesses to a corresponding entry in the secondary cache memory 46 to write back the data stored in the first cache memory 45 to the secondary cache memory 46.

Here, the write miss occurs in cases where the corresponding entry does not exist in the accessed cache memory. That is, the entry state of the secondary cache memory 46 is "invalid" in the sixth pattern.

In this pattern, the operation depends on the condition indicated by a symbol "if (V*D)". The symbol "if (V*D)" indicates that the data stored in the first cache memory 45 is valid and the data in the first cache memory 45 does not agree with the data in the main memory 47.

When the entry state of the first cache memory 45 is "clean" indicated by the symbol "CE" or "S", the data in the first cache memory 45 is abandoned in cases where the condition "if (V,D)" is satisfied. The reason is because the up-to-date data stored in the secondary cache memory 46 has been already written back to the main memory 47. That is, the entry state of the first cache memory 45 is changed to "invalid".

On the other hand, the data in the first cache memory 45 is written back to the second cache memory 46 in cases where the condition "if (V*D)" is not satisfied. The reason is because the data stored in the first cache memory 45 agrees with the data stored in the main memory 47. That is, the entry state of the secondary cache memory 46 is changed to "clean" and the entry state of the first cache memory 45 is changed to "invalid". Therefore, the entry field of the first cache memory 45 relating to the invalidated entry can be utilized for the other entry.

Cases 6-2 and 6-4:

When the entry state of the first cache memory 45 is "dirty" indicated by the symbol "DE" or "DS", the data stored in the first cache memory 45 is necessarily up-to-date. Therefore, In cases where the condition "if (V*D)" is satisfied, the data stored in the first cache memory 45 is written back to one of the main memories 47. In detail, in cases where the condition "if (LA)" is satisfied, the data stored in the first cache memory 45a is written back to the main memory 47a. In cases where the condition "if (LA)" is not satisfied, the data stored in the first cache memory 45a is written back to the main memory 47b. Thereafter, the entry state of the first cache memory 45 is changed to "invalid".

On the other hand, in cases where the condition "if (V*D)" is not satisfied, the data stored in the first cache memory 45 is written back to the second cache memory 46. The reason is because the data stored in the secondary cache memory 46 can be easily written back to the main memory 47. Thereafter, the entry state of the first cache memory 45 is changed to "invalid".

Cases 7-1 to 7-4:

The operation according to the seventh pattern is implemented in cases where (1) the CPU 44 instructs the secondary cache memory 46 to write back the data of an entry in the secondary cache memory 46 to the first cache memory 45, and (2) a write miss occurs when the CPU 44 accesses to a corresponding entry in the first cache memory 45 to write back the data stored in the secondary cache memory 46 to the first cache memory 45.

That is, the entry state of the secondary cache memory 46 is not "invalid". Also, the entry accessed by the secondary cache memory 46 does not exist in the first cache memory 45, or the state of the entry accessed by the first cache memory 45 is "invalid" although the entry accessed by the secondary cache memory 46 exist in the first cache memory 45.

The entry states in the first and secondary cache memories 45, 46 is given by each of the operations according to the fifth and sixth patterns (the cases 5-1 to 5-4 and 6-1 to 6-4).

An entry field of the secondary cache memory 46 in which one entry E1 has been already stored is required to store the other entry E2 for some reason. Therefore, the data of the entry E1 stored in the secondary cache memory 46 is required to write back to either the first cache memory 45 or the main memory 47.

In the present invention, the data of the entry E1 stored in the secondary cache memory 46 is written back to the first cache memory 45 according to the operational protocol.

In this pattern, in cases where each entry in the first cache memory 45 is not in the "invalid" state and the entry accessed by the secondary cache memory 46 does not exist in the first cache memory 45, one of the entry fields in the first cache memory 45 is selected by utilizing a least recently used (LRU) algorithm. In the LRU algorithm, one entry E3 which is not accessed for the longest time in all the entries by the other cache memories or the main memory 47 is selected. Thereafter, the state of the selected entry E3 is changed to "invalid".

On the other hand, in cases where at least one entry E3 in the first cache memory 45 is in the "invalid" state, the entry E3 is selected.

Thereafter, the entry E1 stored in the second cache memory 46 is written back to an entry field relating to the selected entry E3 in the first cache memory 45 at the medium access speed. Therefore, the data of the entry E1 is written back to the first cache memory 45. And, the entry state of the secondary cache memory 46 is changed to "invalid".

Case 8-1:

In the above case, the data is written back by implementing the copy instruction stored in the secondary cache memory 46.

Generally, the data stored in the secondary cache memory 46 is written back to the main memory 47 at the low access speed before the entry state of the secondary cache memory 46 is invalidated in the conventional computer system 31.

Accordingly, the write-back operation can be quickly implemented as compared with that in the conventional computer system 31 because the operation is implemented between the first and secondary cache memories 45, 46 at the medium access speed.

Moreover, in cases where one or more than one entry in the first cache memory 45 are in the state "invalid", the number of the "invalid" state entry in the first cache memory 45 is decreased by implementing the write-back operation. Therefore, a hit rate in the first cache memory 45 is increased so that the performance of the computer system 41 can be improved.

Next, the operation according to the eighth pattern is implemented in cases where (1) the CPU 44 instructs the secondary cache memory 46 to write back the data of an entry in the secondary cache memory 46 to the first cache memory 45, and (2) a write hit occurs when the CPU 44 accesses to a corresponding entry in the first cache memory 45 to write back the data stored in the secondary cache memory 46 to the first cache memory 45.

That is, the entry in the first cache memory 45 exists in the secondary cache memory 46, and the entry state of the first cache memory 45 is not "invalid".

In addition, when all the entries field of the secondary cache memory 46 are occupied by the entries, it is required in the eighth pattern that the other entry is stored in an entry field of the secondary cache memory 46 when the second cache memory becomes unnecessary. Therefore, it is required that this operation is implemented according to an operational protocol as described in cases 8-1 to 8-6.

When the entry state of the secondary cache memory 46 is "clean and exclusive" and the entry state of the first cache memory 45 is not "invalid", the up-to-date data has been already stored in the first cache memory 45 because the write hit occurs. For example, in cases where the entry state of the first cache memory 45 is "clean and exclusive" as given examples in both the operations according to the first and second patterns (the cases 1-1 and 2-1), the data stored in the first cache memory 45 agree with the data stored in the secondary cache memory 46. Also, in cases where the entry state of the first cache memory 45 is "dirty", the data stored in the first cache memory 45 does not agree with the data stored in the secondary cache memory 46 because the data stored in the first cache memory 45 is changed to the up-to-date data. Therefore, the data stored in the secondary cache memory 46 is abandoned without implementing the write-back operation. That is, the entry state of the secondary cache memory 46 is changed to "invalid".

Case 8-2:

In cases where the entry state of the secondary cache memory 46 is "dirty and exclusive", the entry state of the first cache memory 45 is either "clean and exclusive" or "dirty and exclusive".

When the entry state of the first cache memory 45 is "clean and exclusive, the data stored in the first cache memory 45 agrees with the data stored in the second cache memory 46 because the entry states of the first and secondary cache memories 45, 46 are set according to the operations of both the first and fourth patterns (the cases 1-2, 4-4, 4-6). That is, the data in the first cache memory 45 agrees with the data in the secondary cache memory 46. Therefore, the write-back operation of the data in the secondary cache memory 46 to the first cache memory 45 is not required. However, the entry state of the secondary cache memory 46 must be transferred to the first cache memory 45 In cases where the entry of the secondary cache memory 46 is invalidated. Therefore, the entry state of the secondary cache memory 46 is copied to the first cache memory 45 at the medium access speed by executing the copy instruction. Thereafter, the entry of the secondary cache memory 46 is invalidated to utilize the entry field relating to the invalidated entry for the other entry in a following operation.

Case 8-3:

Conventionally, in cases where the entry in the second cache memory 46 is in the "dirty" state, the data of the entry is written back to the main memory 47 at the slow access speed. Therefore, the CPU execution time in the conventional computer system 31 substantially deteriorates. However, the CPU execution time in the computer system 41 according to the present invention is largely and substantially improved because the entry state of the secondary cache memory 46 is copied to the first cache memory 45 at the medium access speed.

When the entry state of the first cache memory 45 is "dirty and exclusive", the up-to-date data Du is stored in the first cache memory 45 and does not agree with the data stored in the second cache memory 46 because the entry states of the first and secondary cache memories 45, 46 are set according to the fourth pattern (the cases 4-1, 4-2). Therefore, the data stored in the secondary cache memory 46 is of no value. As a result, the entry of the secondary cache memory 46 is invalidated to utilize the entry field relating to the invalidated entry for the other entry without implementing the write-back operation of the data in the secondary cache memory 46 to the first cache memory 45.

Case 8-4:

When the entry state of the secondary cache memory 46 is "clean and shared" and the entry state of the first cache memory 45 is not "invalid", the up-to-date data has been already stored in the first cache memory 45 because the entry state of the first cache memory 45 is not "invalid" and the write hit occurs. For example, in cases where the entry state of the first cache memory 45 is "clean and shared" as given examples according to the operations of both the first and second patterns (the cases 1-3, 2-2), the data stored in the first cache memory 45 agrees with the data stored in the secondary cache memory 46. Also, in cases where the entry state of the first cache memory 45 is "dirty", the data stored in the first cache memory 45 does not agree with the data stored in the secondary cache memory 46 because the data stored in the first cache memory 45 is changed to the up-to-date data. Therefore, the data stored in the secondary cache memory 46 is abandoned without implementing the write-back operation. That is, the entry state of the secondary cache memory 46 is changed to "invalid".

Case 8-5:

In cases where the entry state of the secondary cache memory 46 is "dirty and shared", the entry state of the first cache memory 45 is either "clean and shared" or "dirty and shared".

When the entry state of the first cache memory 45 is "clean and shared", the data stored in the first cache memory 45 agrees with the data stored in the second cache memory 46 because the entry states of the first and secondary cache memories 45, 46 are set according to the operations of both the first and fourth patterns (the cases 1-4, 4-4, and 4-6). Therefore, the write-back operation of the data in the secondary cache memory 46 to the first cache memory 45 is not required. However, the entry state of the secondary cache memory 46 must be transferred to the first cache memory 45 in cases where the entry of the secondary cache memory 46 is invalidated. Therefore, the entry state of the secondary cache memory 46 is copied to the first cache memory 45 at the medium access speed by executing the copy instruction. Thereafter, the entry of the secondary cache memory 46 is invalidated to utilize the entry field relating to the invalidated entry for the other entry.

Case 8-6:

Conventionally, in cases where the entry in the second cache memory 46 is in the "dirty" state, the data of the entry is written back to the main memory 47 at the slow access speed. Therefore, the CPU execution time in the conventional computer system 31 substantially deteriorates. However, the CPU execution time in the computer system 41 according to the present invention is largely and substantially improved because the entry state of the secondary cache memory 46 is copied to the first cache memory 45 at the medium access speed.

When the entry state of the first cache memory 45 is "dirty and shared", the data stored in the first cache memory 45 agrees with the data stored in the secondary cache memory 46 or is the up-to-date data Du. Therefore, the data stored in the secondary cache memory 46 is of no value. As a result, the entry of the secondary cache memory 46 is invalidated to utilize the entry field relating to the invalidated entry for the other entry without implementing the write-back operation of the data in the secondary cache memory 46 to the first cache memory 45.

Accordingly, the operation according to the eighth pattern is rapidly implemented as compared with that in the conventional computer system 31.

Moreover, in cases where the data in the secondary cache memory 46a is stored in an entry and the entry does not exist in the main memory 47a, the data in the secondary cache memory 46a must be written back to the main memory 47b of the other processing system with hierarchical memories 42b through the common bus 43 in the conventional computer system 31. However, the data in the second cache memory 46a can be written back to the main memory 47a of the same processing system with hierarchical memories 42a without being transmitted through the common bus 43 in the computer system 41 according to the present invention.

Accordingly, the amount of the data transmitted through the common bus 43 is largely decreased in cases where a write-back operation is implemented. Therefore, the operational performance in the computer system 41 can be rapidly implemented.

Next, a second embodiment according to the present invention is described with reference to FIG. 7.

Figure 7:
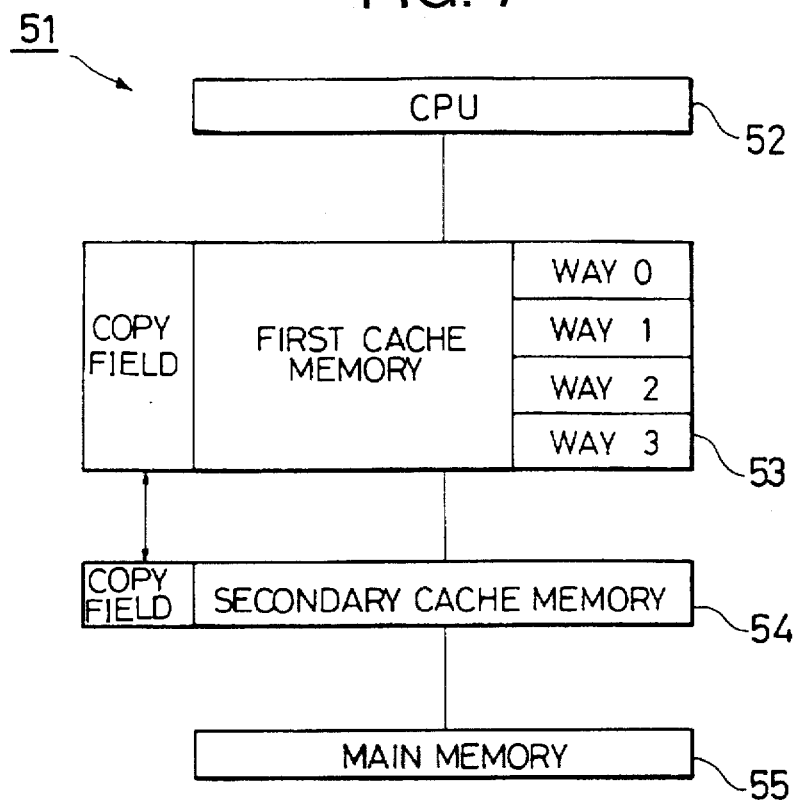
FIG. 7 is a block diagram of a processing system with hierarchical cache memories, the system being formed by a non-multi-inclusion method.

FIG. 7 is a block diagram of a processing system with hierarchical cache memories, the system being formed by the non-multi-inclusion method.

As shown in FIG. 7, a processing system with hierarchical memories 51 comprises:

a CPU 52 for processing pieces of data at high access speed;

a first cache memory 53 with a medium memory capacity connected with the CPU 52 for storing pieces of data in corresponding entries,
  (1) the entries in the memory 53 being arranged according to the 4-way set associative method in which four ways W0, W1, W2, and W3 are provided,
  (2) the data stored in the first cache memory 53 being read out to the CPU 52 through a way at the high access speed, and
  (3) up-to-date data calculated in the CPU 52 being written back to the first cache memory 53 through a way at the high access speed;

a secondary cache memory 54 with a small memory capacity connected with the first cache memory 53 for storing pieces of data in corresponding entries.
  (1) the entries in the memory 54 being arranged according to the direct map method,
  (2) the data stored in the secondary cache memory 54 being written back to the first cache memory 53 at medium access speed if necessary, and
  (3) the data stored in the first cache memory 53 being written back to the second cache memory 54 at the medium access speed if necessary; and a main memory 55 with a large memory capacity for storing pieces of data processed in the CPU 52 in corresponding entries,
  (1) the data stored in the main memory 55 being copied to the secondary cache memory 54 at low access speed if necessary, and
  (2) the data stored in the secondary cache memory 54 being written back to the main memory 55 at the low access speed if necessary.

The memory capacity of the first cache memory 53 is larger than that of the secondary cache memory 54 and is smaller than that of the main memory 55. On the other hand, the access speed of the secondary cache memory 54 is lower than that of the first cache memory 53 and is higher than that of the main memory 55.

Each entry is stored in an entry field in the same manner as that in the first embodiment. That is, the entry field is provided with tag and block fields in which a tag number and a block number are written to indicate an address of the data, a word field in which the data is stored, and a state information field in which a state information for indicating the entry state is stored.

Each cache memory 53, 54 is provided with a copy field in which a copy instruction is stored. The data stored in one cache memory is written back to the other cache memory by implementing the copy instruction of one cache memory. Also, the state information stored in the entry of one cache memory is written back to the other cache memory by implementing the copy instruction of one cache memory.

In the above configuration, the entries stored in the second cache memory 54 are written back to the first cache memory 53 through four ways W0 to W3 without being written back to the main memory 55 when the operations according to the seventh and eighth patterns are implemented.

In general, the memory capacity of the first cache memory is smaller than that of the secondary cache memory in the multi-inclusion method because the entries stored in the first cache memory must be stored in the secondary cache memory.

In the second embodiment, the memory capacity of the first cache memory 53 can be larger than that of the secondary cache memory 54 because the processing system with hierarchical memories 51 is formed by the non-multi-inclusion method. Therefore, the number of the entries stored in the first cache memory 58 can be larger than that in the secondary cache memory 54 in the processing system with hierarchical memories 51.

Accordingly, the operations according to the seventh and eighth patterns can be easily implemented.

Moreover, because the first cache memory 53 is provided with four ways, the entries written back to the first cache memory 53 can be efficiently and rapidly stored because the hit ratio is increased in the first cache memory 53.

Next, a third embodiment according to the present invention is described with reference to FIG. 8.

Figure 8:
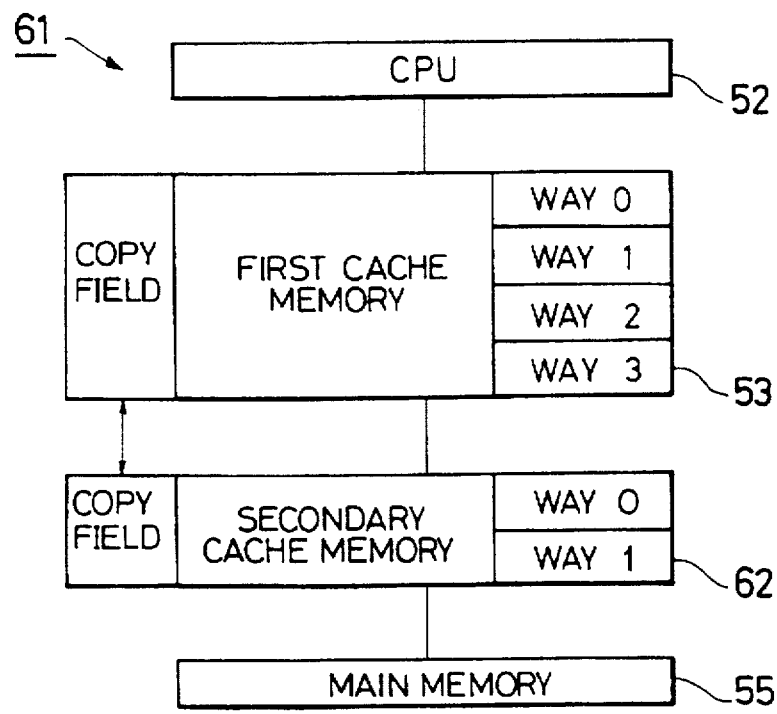
FIG. 8 is a block diagram of a processing system with hierarchical cache memories, the system being formed by a non-multi-inclusion method.

FIG. 8 is a block diagram of a processing system with hierarchical cache memories, the system being formed by the non-multi-inclusion method.

As shown in FIG. 8, a processing system with hierarchical memories 61 comprises:

the CPU 52;

the first cache memory 53;

a secondary cache memory 62 with a small memory capacity connected with the first cache memory 53 for storing pieces of data in corresponding entries,
  (1) the entries in the memory 62 being arranged according to the 2-way set associative method in which two ways W0, W1 are provided,
  (2) the data stored in the secondary cache memory 62 being written back to the first cache memory 53 through a way at medium access speed if necessary, and
  (3) the data stored in the first cache memory 53 being written back to the second cache memory 62 through a way at the medium access speed if necessary; and the main memory 55.

The memory capacity of the first cache memory 53 is larger than that of the secondary cache memory 62 and is smaller than that of the main memory 55. On the other hand, the access speed of the secondary cache memory 62 is lower than that of the first cache memory 53 and is higher than that of the main memory 55.

Each entry is stored in an entry field in the same manner as that in the first embodiment. That is, the entry field is provided with tag and block fields in which a tag number and a block number are written to indicate an address of the data, a word field in which the data is stored, and a state information field in which a state information for indicating the entry state is stored.

Each cache memory 53, 62 is provided with a copy field in which a copy instruction is stored. The data stored in one cache memory is written back to the other cache memory by implementing the copy instruction of one cache memory. Also, the state information stored in the entry of one cache memory Is written back to the other cache memory by implementing the copy instruction of one cache memory.

In the above configuration, the CPU execution time in the secondary cache memory 62 is improved because the cache memory 62 is provided with two ways.

In general, In cases where the number of ways in the first cache memory is larger than that in the secondary cache memory, the operations according to the seventh and eighth patterns are efficiently implemented.

Next, a fourth embodiment according to the present invention is described with reference to FIG. 9.

FIG. 11 is a block diagram of a processing system with hierarchical cache memories, the system being formed by the multi-inclusion method.

Figure 9:
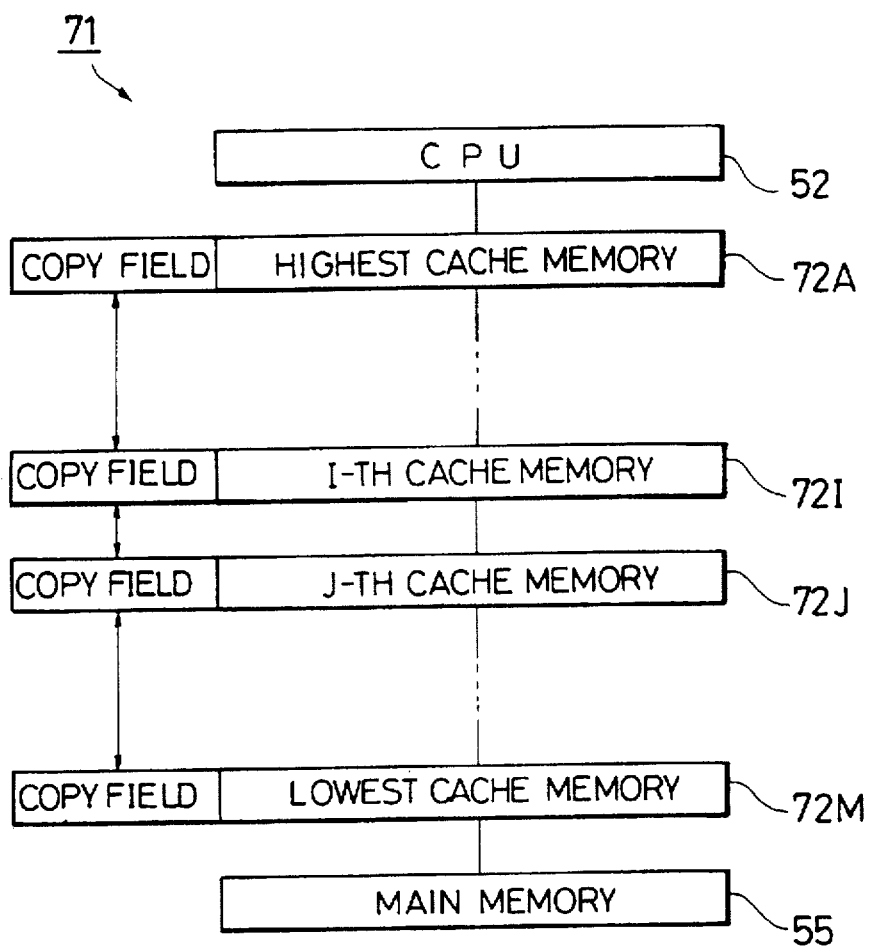
FIG. 9 is a block diagram of a processing system with hierarchical cache memories, the system being formed by a multi-inclusion method.

As shown in FIG. 9, a processing system with hierarchical memories 71 comprises:

the CPU 52;

a plurality of cache memories 72 (72a to 72m) connected with the CPU 52 in series for respectively storing pieces of data in corresponding entries,
(1) the memory capacity of the upper cache memory 721 being smaller than that of the lower cache memory 72j,
(2) the access speed of the upper cache memory 721 being higher than that of the lower cache memory 72j,
(3) the data stored in the cache memory 72 being read out to the CPU 52 at the high access speed, and
(4) up-to-date data calculated in the CPU 52 being written back to the cache memory 72 at the high access speed if necessary;

the main memory 55.

Each entry is stored in an entry field in the same manner as that in the first embodiment. That is, the entry field is provided with tag and block fields in which a tag number and a block number are written to indicate an address of the data, a word field in which the data is stored, and a state information field in which a state information for indicating the entry state is stored.

Each cache memory 72 is provided with a copy field in which a copy instruction is stored. The data stored in one cache memory is written back to the other cache memory by implementing the copy instruction of one cache memory. Also, the state information stored in the entry of one cache memory is written back to the other cache memory by implementing the copy instruction of one cache memory.

In the above configuration, in cases where one entry E1 is stored in an entry field F1 of the lowest cache memory 72m and the other entry E2 is urged to store in the entry field F1, the entry E2 is transferred to one of the upper cache memories 72 before the entry E1 of the entry field F1 in the lowest cache memory 72m is invalidated. Thereafter, the entry E2 is stored in the entry field F1.

Therefore, the entry E1 can be written back at a fast access speed without being written back to the main memory 55 at a low access speed slower than the fast access speed.

In addition, in cases where one entry E3 is stored in an entry field F8 of the cache memory 72j and the other entry E4 is urged to store in the entry field F3, the entry E3 is transferred to one of the upper cache memories 72 before the entry E3 of the entry field F1 in the cache memory 72j is invalidated. Thereafter, the entry E4 is stored in the entry field F3.

Therefore, the entry E3 is written back to the upper cache memory 72 at a first access speed without being written back to the lower cache memory 72 at a second access speed slower than the first access speed.

Accordingly, the operations according to the seventh and eighth patterns can be efficiently implemented.

In addition, the CPU execution time does not deteriorate in the processing system with hierarchical memories 71 in the same manner as in the computer system 41 shown in FIG. 4.

The processing system with hierarchical memories 71 is formed by the multi-inclusion method. However, it is preferable that the processing system with hierarchical memories 71 be formed by the non-multi-inclusion method. In addition, it is preferable that the entries in each cache memory 72 be arranged according to the set associative method. In this case, the number of the ways in the upper cache memory 72: is faster than that in the lower cache memory 72j, and the memory capacity of the upper cache memory 72j is larger than that of the lower cache memory 72j.

Figure 10:
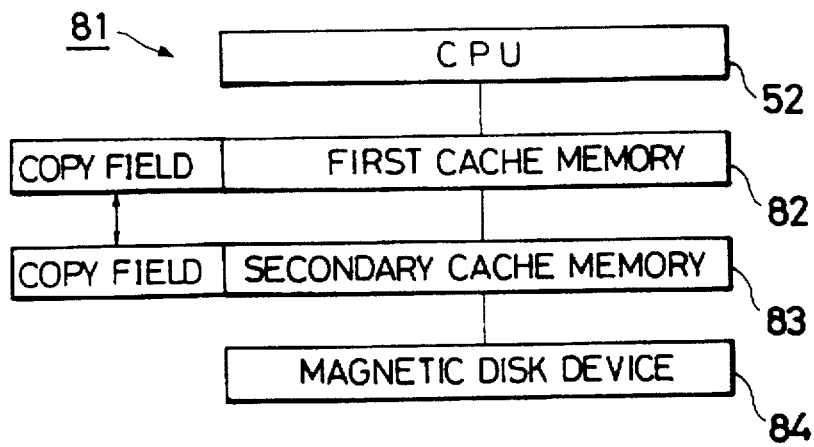
FIG. 10 is a block diagram of a processing system with hierarchical memories, the system being formed by a multi-inclusion method.

Next, a fifth embodiment according to the present invention is described with reference to FIG. 10. FIG. 10 is a block diagram of a processing system with hierarchical cache memories, the system being formed by the multi-inclusion method.

As shown in FIG. 12, a processing system with hierarchical memories 81 comprises:

a CPU 52;

a first cache memory 82 with a small memory capacity connected with the CPU 52 for storing pieces of data in corresponding entries,
(1) the data stored in the first cache memory 82 being read out to the CPU 52 at the high access speed, and
(2) up-to-date data calculated in the CPU 52 being written back to the first cache memory 82 at the high access speed;

a secondary cache memory 83 with a medium memory capacity connected with the first cache memory 82 for storing pieces of data in corresponding entries,
(1) the data stored in the secondary cache memory 83 being written back to the first cache memory 82 at medium access speed, and
(3) the data stored in the first cache memory 82 being written back to the second cache memory 83 at the medium access speed; and a magnetic disk device 84 with a very large memory capacity for storing pieces of data processed in the CPU 52 in corresponding entries,
(1) the data stored in the magnetic disk device 84 being copied to the secondary cache memory 83, and
(2) the data stored in the secondary cache memory 83 being written back to the magnetic disk device 84 if necessary.

The memory capacity of the secondary cache memory 83 is larger than that of the first cache memory 82 and is smaller than that of the magnetic disk device 84. On the other hand, the access speed of the secondary cache memory 83 is lower than that of the first cache memory 82 and is higher than that of the magnetic disk device 84.

The memory capacity of the magnetic disk device 84 is larger than that of the main memories 47, 55. On the other hand, the access speed of the magnetic disk device 84 is lower than that of the main memories 47, 55.

Each entry is stored in an entry field in the same manner as that in the first embodiment. That is, the entry field is provided with tag and block fields in which a tag number and a block number are written to indicate an address of the data, a word field in which the data is stored, and a state information field in which a state information for indicating the entry state is stored.

Each cache memory 82, 83 is provided with a copy field in which a copy instruction is stored. The data stored in one cache memory is written back to the other cache memory by implementing the copy instruction of one cache memory. Also, the state information stored in the entry of one cache memory is written back to the other cache memory by implementing the copy instruction of one cache memory.

In the above configuration, in cases where one entry E1 is stored in an entry field of the secondary cache memory 83 and the other entry E2 is induced to store in the entry field, the operations according to the seventh and eighth patterns are efficiently implemented.

Therefore, the entry E1 is written back to the first cache memory 82 at the high access speed without being written back to the magnetic disk device 8 at the low access speed.

Accordingly, the CPU execution time does not deteriorate in the processing system with hierarchical memories 81 in the same manner as in the computer system 41 shown in FIG. 4.

Moreover, because the access speed of the magnetic disk device 84 is lower than that of the main memories 47, 45, the improvement of the CPU execution time is remarkable.

The processing system with hierarchical memories 81 is formed by the multi-inclusion method. However, it is preferable that the processing system with hierarchical memories 81 be formed by the non-multi-inclusion method. In addition, it is preferable that the entries in each cache memory 82, 83 be arranged according to the set associative method. In this case, the number of the ways in the first cache memory 82 is larger than that in the lower cache memory 83, and the memory capacity of the first cache memory 82 is larger than that of the secondary cache memory 83.

Moreover, it is preferable that a large number of cache memories be set in series in place of the first and secondary cache memories in the same manner as in the processing system with hierarchical memories 71.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A method for processing data by utilizing hierarchical cache memories, comprising the steps of:

preparing a main memory for storing large pieces of data, the data being read from and written to the main memory at a low access speed;

preparing a plurality of cache memories, each having a plurality of entry fields, hierarchically connected in series between a processing unit and the main memory such that one of the plurality of cache memories is connected to the processing unit and is a highest cache memory and another one of the plurality of cache memories is connected to the main memory and is a lowest cache memory such that an upper cache memory is connected closer in series to the processing unit than a lower cache memory which is connected in series closer to the main memory than the upper cache memory, for respectively storing portions of the data stored in the main memory in a plurality of entries which correspond to locations of the data stored in the main memory, each of the plurality of entries being stored in a corresponding one of the plurality of entry fields of the plurality of cache memories;

preparing the processing unit connected to the highest cache memory for two operations implemented by the processing unit;

implementing a first operation by
(1) storing an entry E1 in the highest cache memory, with portions of data stored in the main memory,
(2) reading out the data of the entry E1 stored in the highest cache memory at a high access speed after a cache read hit occurs in the highest cache memory,
(3) processing, in the processing unit, the data read out from the highest cache memory, and
(4) writing up-to-date data in the entry E1 of the highest cache memory at the high access speed, the up-to-date data being obtained by processing the data read out from the highest cache memory; and implementing a second operation by
(1) writing up-to-date data processed in the processing unit in an entry field of a lower cache memory M1 at a medium access speed, the entry field already storing an entry E2,
(2) instructing the lower cache memory M1 to write back the entry E2 to a corresponding entry field in an upper cache memory M2 in response to the entry field in the lower cache memory M1 already storing the entry E2,
(3) accessing the upper cache memory M2 at the corresponding entry field to write the entry E2 in response to the write back instruction, the accessing step resulting in a write miss occurring in the upper cache memory M2,
(4) invalidating an entry E3 stored in the upper cache memory M2 in response to the write miss occurring in the upper cache memory M2 by selecting the entry E3 in cases where no invalidated entry exists in the upper cache memory M2 or by selecting an invalidated entry E3 in cases where at least one invalidated entry exists in the upper cache memory M2,
(5) writing back the entry E2 to an entry field of the upper cache memory M2 in which the entry E3 is stored to replace the entry E3 with the entry E2 at the medium access speed after the invalidating step invalidates the entry E3, and
(6) invalidating the written-back entry E2 of the lower cache memory M1 to indicate that the written-back entry E2 in the lower cache memory M1 is invalid.

2. A method according to claim 1 in which the invalidated entry E3 in the second operation is selected by utilizing a least recently used algorithm.

3. A method for processing data by utilizing hierarchical cache memories, comprising the step of:

preparing a main memory for storing large pieces of data, the data being read from and written to the main memory at a low access speed;

preparing a plurality of cache memories, hierarchically connected in series between a processing unit and the main memory such that one of the plurality of cache memories is connected to the processing unit and is a highest cache memory and another one of the plurality of cache memories is connected to the main memory and is a lowest cache memory, for respectively storing a portion of the data stored in the main memory in a plurality of entries corresponding to locations of the data stored in the main memory, each of the plurality of entries being stored in an entry field of at least one of the plurality of the cache memories, and each of the plurality of entries being provided with state information indicating a type of entry state;

preparing the processing unit connected to the highest cache memory for two operations implemented by the processing unit;

implementing a first operation by
(1) storing an entry E1 with portions of data stored in the main memory in the highest cache memory,
(2) reading out the data of the entry E1 stored in the highest cache memory at a high access speed after a cache read hit occurs in the entry E1 of the highest cache memory,
(3) processing the data read out from the highest cache memory in the processing unit, and
(4) writing up-to-date data in the entry E1 of the highest cache memory at the high access speed, the up-to-date data being obtained by processing the data read out from the highest cache memory; and implementing a second operation by
(1) instructing at least two of the plurality of cache memories to store an entry E2 with up-to-date data processed by the processing unit such that an upper cache memory is connected closer in series to the processing unit than a lower cache memory which is connected in series closer to the main memory than the upper cache memory,
(2) setting the state of the entry E2 in the upper cache memory to a clean state in response to the store instruction, the clean state of the entry E2 in the upper cache memory indicating that the up-to-date data of the entry E2 agrees with a corresponding piece of data in the main memory and being indicated by the state information of the entry E2,
(3) setting the state of the entry E2 in the lower cache memory to a dirty state in response to the store instruction, the dirty state of the entry E2 in the lower cache memory indicating that the up-to-date data of the entry E2 does not agree with a corresponding piece of data in the main memory and being indicated by the state information of the entry E2,
(4) copying the state information of the entry E2 stored in the lower cache memory to the entry E2 stored in the upper cache memory at a medium access speed, thereby changing the clean state of the entry E2 in the upper cache memory to the dirty state, and
(5) invalidating the entry E2 of the lower cache memory to indicate that the data of the entry E2 in the lower cache memory is invalid after copying the state information to the entry E2 in the upper cache memory, the invalid state of the entry E2 in the lower cache memory being indicated by the state information of the entry E2.

4. A processing system with hierarchical cache memories comprising:

a main memory for storing large pieces of data, the data being read from and written to the main memory at a low access speed;

a plurality of cache memories, hierarchically arranged in series between a processing unit and the main memory such that one of the plurality of cache memories is connected to the processing unit and is a highest cache memory and another one of the plurality of cache memories is connected to the main memory and is a lowest cache memory, for respectively storing a part of the data stored in the main memory in a plurality of entries which correspond to locations of the data stored in the main memory and such that an upper cache memory is connected closer in series to the processing unit than a lower cache memory which is connected in series closer to the main memory than the upper cache memory, a portion of a large piece of data stored in the main memory being stored in an entry field of at least one of the plurality of cache memories, each of the plurality of entries being provided with state information indicating a type of entry state;

the processing unit connected to the highest cache memory for implementing two operations, a first operation implemented by
(1) writing up-to-date data processed in the processing unit to an entry field of a lower cache memory M1 at a medium access speed, the entry field already storing an entry E1,
(2) instructing the lower cache memory M1 to write back the entry E1 to a corresponding entry field in an upper cache memory M2 in response to the entry field in the lower cache memory M1 already storing the entry E1,
(3) accessing the upper cache memory M2 at the corresponding entry field to write back the entry E1 in response to the write back instruction, the accessing step resulting in a write miss occurring in the upper cache memory M2,
(4) invalidating an entry E2 stored in the upper cache memory M2 in response to the write miss occurring in the upper cache memory M2 by selecting the entry E2 in cases where no invalidated entry exists in the upper cache memory M2 or by selecting an invalidated entry E2 in cases where one or more invalidated entries exist in the upper cache memory M2,
(5) writing back the entry E1 to an entry field of the upper cache memory M2 in which the entry E2 is stored to replace the entry E2 with the entry E1 at the medium access speed after the invalidating step invalidates the entry E2,
(6) invalidating the written-back entry E1 of the lower cache memory M1 to indicate that the written-back entry E1 in the lower cache memory M1 is invalid; and a second operation implemented by
(7) instructing both a lower cache memory M3 and an upper cache memory M4 to store an entry E3 with up-to-date data processed by the processing unit,
(8) setting the state of the entry E3 in the upper cache memory M4 to a clean state in response to the store instruction, the clean state of the entry E3 in the upper cache memory M4 indicating that the up-to-date data of the entry E3 in the upper cache memory M4 agrees with a corresponding piece of data in the main memory and being indicated by the state information of the entry E3,
(9) setting the state of the entry E3 in the lower cache memory M3 to a dirty state in response to the store instruction, the dirty state of the entry E3 in the lower cache memory M3 indicating that the up-to-date data of the entry E3 in the lower cache memory M3 does not agree with a corresponding piece of data in the main memory and being indicated by the state information of the entry E3,
(10) copying the state information of the entry E3 stored in the lower cache memory M3 to the entry E3 stored in the upper cache memory M4 at the medium access speed, thereby changing the clean state of the entry E3 in the upper cache memory M4 to the dirty state, and

(11) invalidating the entry E3 of the lower cache memory M3 to indicate that the data of the entry E3 in the lower cache memory M3 is invalid after copying the state information to the entry E3 in the upper cache memory M4, the invalid state of the entry E3 in the lower cache memory M3 being indicated by the state information of the entry E3.

5. A processing system according to claim 4 in which the speed for accessing entries in the upper cache memory by the processing unit is higher than for accessing entries in the lower cache memory.

6. A processing system according to claim 4 in which a memory capacity of the upper cache memory M4 has a larger number of ways than that of the lower cache memory M3.

7. A processing system according to claim 4 in which the state information of the entry E3 stored in the lower cache memory M3 is copied to the entry E3 stored in the upper cache memory M4 by implementing a copy instruction given by the processing unit.

8. A processing system according to claim 4 in which the entry E1 stored in the lower cache memory M1 is written back to an entry E2 of the upper cache memory M2 selected by a least recently used algorithm in cases where no invalid entry indicated by the state information exists in the upper cache memory M2.

9. A processing system according to claim 4 in which the entry E1 stored in the lower cache memory M1 is written back to an entry E2 of the upper cache memory M2 in which an invalid entry is indicated by the state information.

10. A processing system according to claim 4 in which the entries stored in the upper cache memories M2 and M4 are arranged according to a set associative method, and the entries stored in the lower cache memories M1 and M3 are arranged according to a direct map method.

11. A processing system according to claim 4 in which a number of ways in the upper cache memories M2 and M4, arranged according to a set associative method, is larger than a number of ways in the lower cache memories M1 and M3, arranged according to the set associative method.

12. A processing system according to claim 4 in which the entries stored in the cache memories are arranged according to a set associative method.

13. A processing system according to claim 12 in which a number of ways in the upper cache memories M2 and M4 is larger than a number of ways in the lower cache memories M1 and M3.

14. A processing system according to claim 4 in which the main memory is formed by a magnetic disk device.

15. A computer system comprising a plurality of processing systems as claimed in claim 4 and a common bus connecting the processing systems in parallel for transmitting data from one of the processing systems to others of the processing systems.

16. A hierarchical memory system comprising:

a central processing unit;

a main memory;

a first write-back cache memory connected to said central processing unit; and a second write-back cache memory connected to said first cache memory and said main memory, an access speed of said first cache memory being faster than an access speed of said second cache memory, the central processing unit, in performing a write operation to a location in the second cache memory which results in a write-back operation occuring for an entry already stored at a location in said second cache memory, writes back the already stored entry to said first cache memory to store the already stored entry in said first cache memory.

* * * * *